United States Patent
Okamoto et al.

(10) Patent No.: US 11,781,674 B2
(45) Date of Patent: Oct. 10, 2023

(54) ELECTROMAGNETIC VALVE MANIFOLD

(71) Applicant: CKD CORPORATION, Komaki (JP)

(72) Inventors: Shinichi Okamoto, Komaki (JP); Ikuo Ogino, Komaki (JP); Shinji Itoh, Komaki (JP); Kiyonobu Hayashi, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 17/950,724

(22) Filed: Sep. 22, 2022

(65) Prior Publication Data

US 2023/0106896 A1  Apr. 6, 2023

(30) Foreign Application Priority Data

Sep. 28, 2021  (JP) .................................. 2021-158293

(51) Int. Cl.
  *F16K 11/07* (2006.01)
  *F16K 35/06* (2006.01)
  *F16K 31/06* (2006.01)
  *F16K 11/20* (2006.01)

(52) U.S. Cl.
  CPC .......... *F16K 35/06* (2013.01); *F16K 11/0704* (2013.01); *F16K 11/20* (2013.01); *F16K 31/0613* (2013.01)

(58) Field of Classification Search
  CPC ...... F16K 11/0704; F16K 11/07; F16K 11/10; F16K 11/20; F16K 11/207; F16K 11/22
  See application file for complete search history.

(56) References Cited

U.S. PATENT DOCUMENTS

| 2015/0059893 A1* | 3/2015 | Nishiyama | F16K 15/18 137/596.1 |
| 2017/0307096 A1* | 10/2017 | Janecke | F16K 17/22 |

FOREIGN PATENT DOCUMENTS

JP  61-197364 U  12/1986

* cited by examiner

*Primary Examiner* — Kelsey E Cary
(74) *Attorney, Agent, or Firm* — TAROLLI, SUNDHEIM, COVELL & TUMMINO L.L.P.

(57) ABSTRACT

An electromagnetic valve manifold includes an electromagnetic valve including an output port, a manifold base including an output passage, and a spacer arranged between the manifold base and the electromagnetic valve. The spacer includes a spacer block including a shaft hole and a manual shaft accommodated in the shaft hole. The spacer block includes an output connecting passage that is connected to the shaft hole and connects the output passage and the output port to each other. The manual shaft is configured to be manually operated to be switched between a first switching position, in which the manual shaft allows for connection between the output passage and the output port through the output connecting passage, and a second switching position, in which the manual shaft blocks the connection between the output passage and the output port through the output connecting passage.

10 Claims, 7 Drawing Sheets

ELECTROMAGNETIC VALVE MANIFOLD

BACKGROUND

1. Field

The present disclosure relates to an electromagnetic valve manifold.

2. Description of Related Art

An electromagnetic valve manifold includes an electromagnetic valve and a manifold base, on which the electromagnetic valve is mounted. The manifold base includes a supply passage, an output passage, and a discharge passage. The electromagnetic valve includes a valve casing and a valve member. The valve casing includes a valve hole, a supply port, an output port, and a discharge port. The supply port, the output port, and the discharge port are connected to the valve hole. The supply port is connected to the supply passage of the manifold base. The output port is connected to the output passage of the manifold base. The discharge port is connected to the discharge passage of the manifold base. The valve member is movably accommodated in the valve hole. As the valve member moves in the valve hole, the connection state among the ports is switched, so that the fluid flowing through the output passage drives a fluid pressure device connected to the output passage.

For example, Japanese Laid-Open Utility Model Publication No. 61-197364 discloses an electromagnetic valve manifold that includes a stopper valve arranged between a manifold base and an electromagnetic valve. The stopper valve includes a spool that is switched between a first switching position and a second switching position. When switched to the first switching position, the spool allows for connection between the supply port and the supply passage, connection between the output port and the output passage, and connection between the discharge port and the discharge passage. When switched to the second switching position, the spool blocks the connection between the supply port and the supply passage and the connection between the discharge port and the discharge passage. When in the second switching position, the spool allows for the connection between the output port and the output passage. When in the second switching position, the spool blocks the connection between the discharge port and the discharge passage. Thus, the fluid in the output passage will not be discharged to the outside from the discharge passage through the output port and the discharge port. As a result, the pressure of the fluid between the output passage and the fluid pressure device is maintained, and operation of the fluid pressure device is stopped. Such an electromagnetic valve manifold switches the spool to the second switching position to keep the fluid pressure device deactivated, for example, when an operator performs maintenance. This allows the operator to perform maintenance safely.

In the electromagnetic valve manifold of the above-described publication, when in the second switching position, the spool of the stopper valve allows for the connection between the output port and the output passage. Thus, even if the spool is in the second switching position, the path from the output port to the fluid pressure device is not blocked. Therefore, if, for example, the valve member of the electromagnetic valve malfunctions when the spool is in the second switching position, a change in the pressure of the fluid in the output port may change the pressure of the fluid between the output passage and the fluid pressure device. If the pressure of the fluid between the output passage and the fluid pressure device changes, the pressure of the fluid between the output passage and the fluid pressure device can no longer be maintained. This can cause the fluid pressure device to malfunction. As such, the fluid pressure device may malfunction even if the spool is switched to the second switching position. There is thus room for improvement in terms of reliability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic valve manifold includes an electromagnetic valve, a manifold base on which the electromagnetic valve is mounted, and a spacer. The manifold base includes a supply passage, an output passage, and a discharge passage. The spacer is provided between the manifold base and the electromagnetic valve. The electromagnetic valve includes a valve casing including a valve hole, a valve member that is movably accommodated in the valve hole, and a supply port, an output port, and a discharge port that are formed in the valve casing and respectively connected to the valve hole. The spacer includes a spacer block including a shaft hole, and a manual shaft movably accommodated in the shaft hole. The spacer block includes a supply connecting passage, a discharge connecting passage, and an output connecting passage. The supply connecting passage connects the supply passage and the supply port to each other. The discharge connecting passage connects the discharge passage and the discharge port to each other. The output connecting passage is connected to the shaft hole and connects the output passage and the output port to each other. The output passage is configured such that a fluid flowing through the output passage drives a fluid pressure device connected to the output passage. The manual shaft is configured to be manually operated so as to be switched between a first switching position, in which the manual shaft allows for connection between the output passage and the output port through the output connecting passage, and a second switching position, in which the manual shaft blocks the connection between the output passage and the output port through the output connecting passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electromagnetic valve manifold 10 according to one embodiment will now be described with reference to FIGS. 1 to 7.

<Overall Configuration of Electromagnetic Valve Manifold 10>

Figure 1:
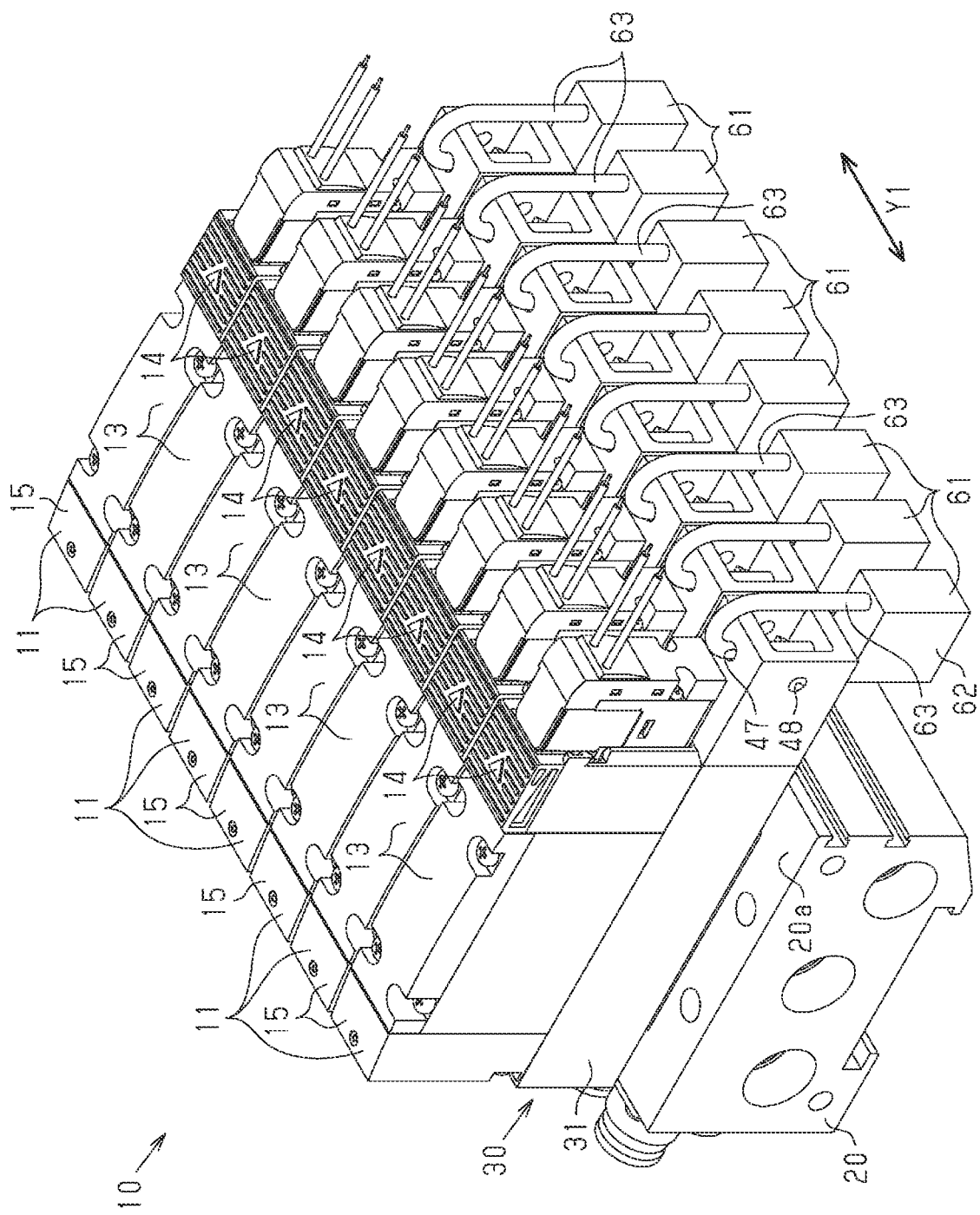
FIG. 1 is a perspective view of an electromagnetic valve manifold according to one embodiment.

As shown in FIG. 1, the electromagnetic valve manifold 10 includes electromagnetic valves 11, a rectangular block-shaped manifold base 20, and spacers 30. The electromagnetic valves 11 are arranged in a single row. Each spacer 30 is arranged between the manifold base 20 and one of the electromagnetic valves 11. The spacers 30 are arranged in the same direction as the direction in which the electromagnetic valves 11 are arranged while being each arranged between the corresponding electromagnetic valve 11 and the manifold base 20. The direction in which the spacers 30 are arranged will hereafter be referred to as an arrangement direction Y1.

Each electromagnetic valve 11 is mounted on a mounting surface 20a of the manifold base 20 with the corresponding spacer 30 between the electromagnetic valve 11 and the mounting surface 20a. The manifold base 20 thus mounts the electromagnetic valves 11. The electromagnetic valves 11, the manifold base 20, and the spacers 30 form the electromagnetic valve manifold 10.

<Configuration of Electromagnetic Valve 11>

Figure 2:
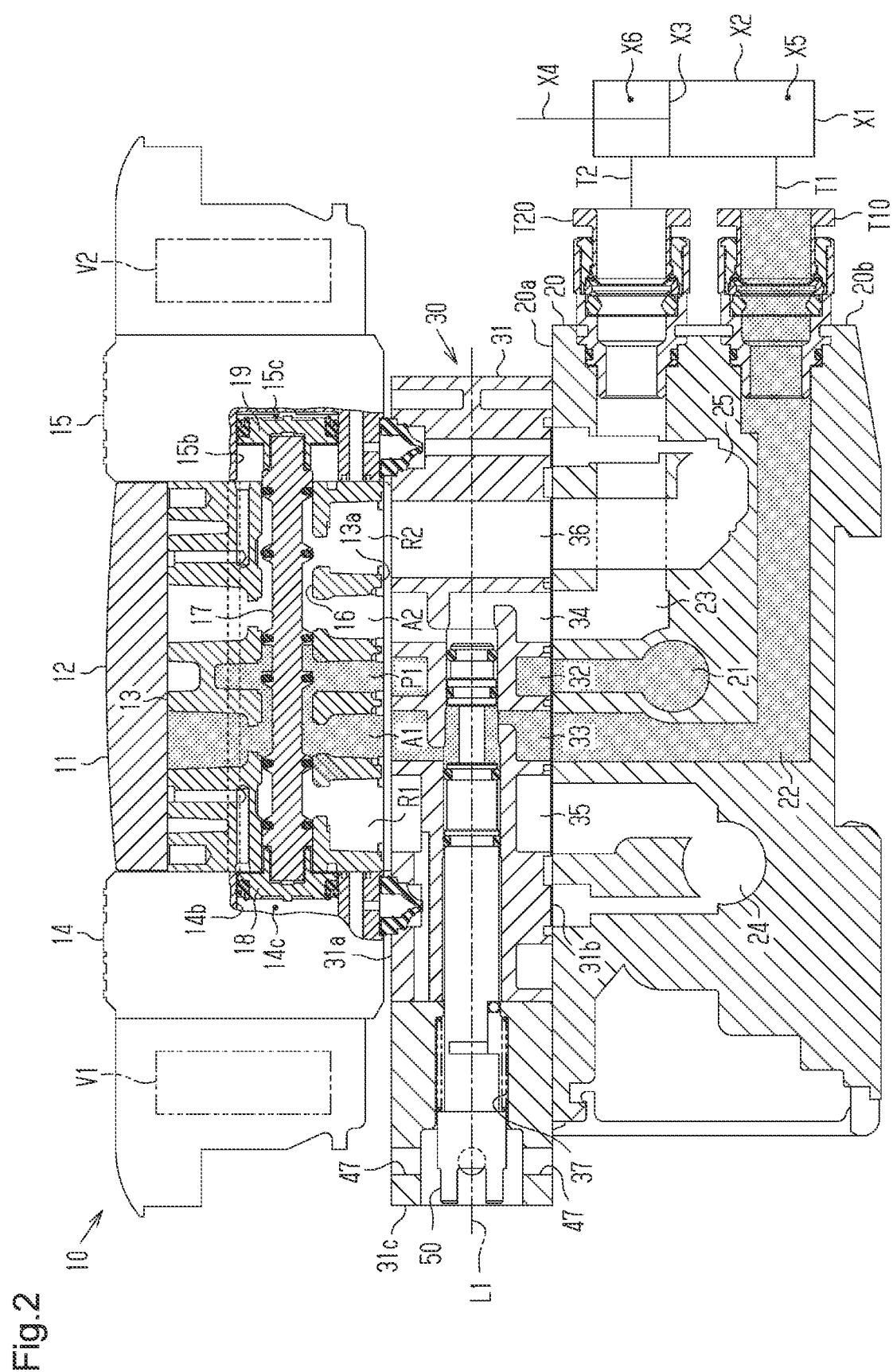
FIG. 2 is a cross-sectional view of the electromagnetic valve manifold of FIG. 1, showing flow of fluid when a manual shaft is in a first switching position.

As shown in FIG. 2, each electromagnetic valve 11 includes an elongated rectangular block-shaped valve casing 12. The valve casing 12 includes an elongated rectangular block-shaped casing body 13, a first coupling block 14, and a second coupling block 15. The casing body 13 is made of, for example, an aluminum alloy. The first coupling block 14 and the second coupling block 15 are made of, for example, plastic. The casing body 13 includes a body facing surface 13a, which faces the spacer 30. The first coupling block 14 is coupled to a first end in the longitudinal direction of the casing body 13. The second coupling block 15 is coupled to a second end in the longitudinal direction of the casing body 13.

<Valve Hole 16>

The casing body 13 has a circular valve hole 16. The valve casing 12 thus has the valve hole 16. The valve hole 16 extends in the longitudinal direction of the casing body 13. A first end of the valve hole 16 opens in a first end face in the longitudinal direction of the casing body 13. A second end of the valve hole 16 opens in a second end face in the longitudinal direction of the casing body 13. The valve hole 16 thus extends through the casing body 13 in the longitudinal direction. The valve hole 16 accommodates a spool valve 17, which is a valve member. The spool valve 17 is allowed to reciprocate within the valve hole 16. The spool valve 17 is thus movably accommodated in the valve hole 16.

The casing body 13 includes a supply port P1, a first output port A1, a second output port A2, a first discharge port R1, and a second discharge port R2, which are each connected to the valve hole 16. Thus, the electromagnetic valve 11 includes the supply port P1, the first output port A1, the second output port A2, the first discharge port R1, and the second discharge port R2, which are formed in the valve casing 12 and connected to the valve hole 16. The first output port A1 and the second output port A2 are formed in the valve casing 12. The first discharge port R1 and the second discharge port R2 are formed in the valve casing 12. The electromagnetic valve 11 of the present embodiment is a five-port electromagnetic valve.

The first discharge port R1, the first output port A1, the supply port P1, the second output port A2, and the second discharge port R2 are arranged in that order from the first end toward the second end in the longitudinal direction of the casing body 13. First ends of the supply port P1, the first output port A1, the second output port A2, the first discharge port R1, and the second discharge port R2 are each connected to the valve hole 16. Second ends of the supply port P1, the first output port A1, the second output port A2, the first discharge port R1, and the second discharge port R2 each open in the body facing surface 13a of the casing body 13.

<First Piston 18 and Second Piston 19>

Each electromagnetic valve 11 includes a first piston 18 and a second piston 19. The first piston 18 has the shape of a disc. The first piston 18 is coupled to a first end of the spool valve 17. The first piston 18 moves integrally with the spool valve 17. The second piston 19 has the shape of a disc. The second piston 19 is coupled to a second end of the spool valve 17. The second piston 19 moves integrally with the spool valve 17.

<First Pilot Chamber 14c and Second Pilot Chamber 15c>

The first coupling block 14 includes a first piston accommodating recess 14b, which is a circular hole. The first piston accommodating recess 14b accommodates the first piston 18, while allowing the first piston 18 to reciprocate. The first piston accommodating recess 14b and the first piston 18 define a first pilot pressure chamber 14c. Pilot fluid is supplied to and discharged from the first pilot pressure chamber 14c.

The second coupling block 15 includes a second piston accommodating recess 15b, which is a circular hole. The second piston accommodating recess 15b accommodates the second piston 19, while allowing the second piston 19 to reciprocate. The second piston accommodating recess 15b and the second piston 19 define a second pilot pressure chamber 15c. Pilot fluid is supplied to and discharged from the second pilot pressure chamber 15c.

The electromagnetic valve 11 includes a first pilot valve V1 and a second pilot valve V2. The electromagnetic valve 11 is therefore a double-solenoid type electromagnetic pilot valve. Application of voltage to the first pilot valve V1 and the second pilot valve V2 is performed, for example, by an external controller (not shown) such as a programmable logic controller (PLC).

<First Position and Second Position of Spool Valve 17>

The spool valve 17 is switchable between a first position and a second position. For example, it is now assumed that voltage is applied to the first pilot valve V1, and that voltage is not applied to the second pilot valve V2. In this case, the first pilot valve V1 supplies compressed fluid, which is pilot fluid, from a fluid supply source (not shown) to the first pilot pressure chamber 14c. The second pilot valve V2 discharges the pilot fluid in the second pilot pressure chamber 15c to the atmosphere. Accordingly, the spool valve 17 moves toward the second piston accommodating recess 15b. As a result, the spool valve 17 is switched to the first position, in which the supply port P1 is connected to the first output port A1, and the second output port A2 is connected to the second discharge port R2. Also, when the spool valve 17 is switched to the first position, the supply port P1 and the second output port A2 are disconnected from each other, and the first output port A1 and the first discharge port R1 are disconnected from each other. FIG. 2 illustrates the flow of fluid with stippling.

Also, it is now assumed that voltage is not applied to the first pilot valve V1, and that voltage is applied to the second pilot valve V2. In this case, the second pilot valve V2 supplies compressed fluid, which is pilot fluid, from the fluid supply source to the second pilot pressure chamber 15c. The first pilot valve V1 discharges the pilot fluid in the first pilot pressure chamber 14c to the atmosphere. Accordingly, the spool valve 17 moves toward the first piston accommodating recess 14b. As a result, the spool valve 17 is switched to the second position, in which the supply port P1 is connected to the second output port A2, and the first output port A1 is connected to the first discharge port R1. Also, when the spool valve 17 is switched to the second position, the supply port P1 and the first output port A1 are disconnected from each other, and the second output port A2 and the second discharge port R2 are disconnected from each other.

Thus, the first pilot valve V1 supplies pilot fluid to and discharges pilot fluid from the first pilot pressure chamber 14c, and the second pilot valve V2 supplies pilot fluid to and discharges pilot fluid from the second pilot pressure chamber 15c, so that the spool valve 17 reciprocates in the valve hole 16 between the first position and the second position. The connection state among the ports is switched as the spool valve 17 is switched between the first position and the second position.

<Configuration of Manifold Base 20>

The manifold base 20 includes a supply passage 21, a first output passage 22, a second output passage 23, a first discharge passage 24, and a second discharge passage 25. The first output passage 22 and the second output passage 23 are formed in the manifold base 20. The first discharge passage 24 and the second discharge passage 25 are formed in the manifold base 20. The supply passage 21, the first output passage 22, the second output passage 23, the first discharge passage 24, and the second discharge passage 25 each include a first end, which opens in the mounting surface 20a.

A second end of the supply passage 21 is connected to the fluid supply source (not shown) through, for example, a pipe and the like. A second end of the first output passage 22 is connected to an actuator X1, which is a fluid pressure device, through a first pipe T1. The first pipe T1 is connected to the manifold base 20 through a first coupling T10. A second end of the second output passage 23 is connected to the actuator X1 through a second pipe T2. The second pipe T2 is connected to the manifold base 20 through the second coupling T20. The second end of the first output passage 22 and the second end of the second output passage 23 open in a side surface 20b of the manifold base 20. The second end of the first discharge passage 24 and the second end of the second discharge passage 25 are exposed to the atmosphere.

The actuator X1 includes a cylinder tube X2. The cylinder tube X2 accommodates a piston X3, while allowing the piston X3 to reciprocate. The piston X3 is coupled to a piston rod X4. The piston rod X4 is selectively protruded from and retracted into the cylinder tube X2. The interior of the cylinder tube X2 is divided into a first pressure chamber X5 and a second pressure chamber X6 by the piston X3. The first output passage 22 is connected to the first pressure chamber X5 through the first pipe T1. The second output passage 23 is connected to the second pressure chamber X6 through the second pipe T2.

<Configuration of Spacer 30>

Figure 3:
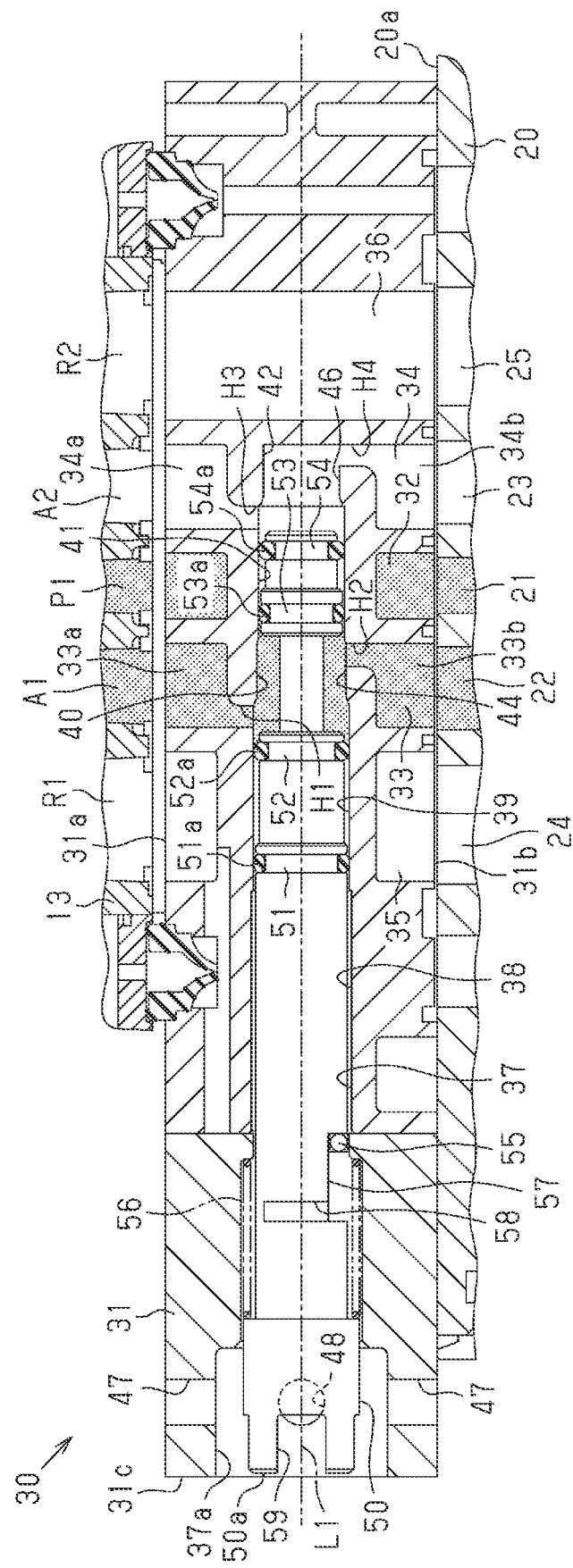
FIG. 3 is an enlarged cross-sectional view of the electromagnetic valve manifold of FIG. 1, showing a spacer when the manual shaft is in the first switching position.

As shown in FIG. 3, each spacer 30 includes a spacer block 31. The spacer block 31 has the shape of an elongated rectangular block. The spacer block 31 includes a first facing surface 31a, which faces the valve casing 12, and a second facing surface 31b, which faces the manifold base 20. The longitudinal direction of the spacer block 31 agrees with the longitudinal direction of the valve casing 12.

The spacer block 31 has a circular shaft hole 37. The shaft hole 37 extends in the longitudinal direction of the spacer block 31. A first end of the shaft hole 37 opens in a first end face 31c, which is an end face in the longitudinal direction of the spacer block 31. The shaft hole 37 thus has an opening 37a, which opens in an end face of the spacer block 31. The first end face 31c of the spacer block 31 is located on a side opposite to the side surface 20b of the manifold base 20.

The spacer block 31 includes a supply connecting passage 32, a first output connecting passage 33, a second output connecting passage 34, a first discharge connecting passage 35, and a second discharge connecting passage 36. The first output connecting passage 33 and the second output connecting passage 34 are formed in the spacer block 31. The first discharge connecting passage 35 and the second discharge connecting passage 36 are formed in the spacer block 31.

<Supply Connecting Passage 32>

A first end of the supply connecting passage 32 opens in the first facing surface 31a and is connected to the supply port P1. A second end of the supply connecting passage 32 opens in the second facing surface 31b and is connected to the supply passage 21. Accordingly, the supply connecting passage 32 connects the supply passage 21 and the supply port P1 to each other. The supply passage 21 and the supply port P1 are thus connected to each other by the supply connecting passage 32. The supply connecting passage 32 extends between the first facing surface 31a and the second facing surface 31b, while detouring around the shaft hole 37.

<First Output Connecting Passage 33>

The first output connecting passage 33 includes a first passage 33a and a second passage 33b. A first end of the first passage 33a opens in the first facing surface 31a and is connected to the first output port A1. A second end of the first passage 33a is connected to the shaft hole 37. The first passage 33a thus opens in the inner peripheral surface of the shaft hole 37 and connects the first output port A1 and the shaft hole 37 to each other.

A first end of the second passage 33b opens in the second facing surface 31b and is connected to the first output passage 22. A second end of the second passage 33b is connected to the shaft hole 37. The second passage 33b opens in the inner peripheral surface of the shaft hole 37 and connects the first output passage 22 and the shaft hole 37 to each other. The first output connecting passage 33 is connected to the shaft hole 37 and connects the first output passage 22 and the first output port A1 to each other. The first output passage 22 and the first output port A1 are connected to each other through the first output connecting passage 33.

<Second Output Connecting Passage 34>

The second output connecting passage 34 includes a first passage 34a and a second passage 34b. A first end of the first passage 34a opens in the first facing surface 31a and is connected to the second output port A2. A second end of the first passage 34a is connected to the shaft hole 37. The first passage 34a thus opens in the inner peripheral surface of the shaft hole 37 and connects the second output port A2 and the shaft hole 37 to each other.

A first end of the second passage 34b opens in the second facing surface 31b and is connected to the second output passage 23. A second end of the second passage 34b is connected to the shaft hole 37. The second passage 34b opens in the inner peripheral surface of the shaft hole 37 and connects the second output passage 23 and the shaft hole 37 to each other. The second output connecting passage 34 is connected to the shaft hole 37 and connects the second output passage 23 and the second output port A2 to each other. The second output passage 23 and the second output port A2 are connected to each other through the second output connecting passage 34.

<First Discharge Connecting Passage 35>

A first end of the first discharge connecting passage 35 opens in the first facing surface 31a and is connected to the first discharge port R1. A second end of the first discharge connecting passage 35 opens in the second facing surface 31b and is connected to the first discharge passage 24. The first discharge connecting passage 35 thus connects the first discharge passage 24 and the first discharge port R1 to each other. The first discharge passage 24 and the first discharge port R1 are therefore connected to each other through the first discharge connecting passage 35. The first discharge connecting passage 35 extends between the first facing surface 31a and the second facing surface 31b, while detouring around the shaft hole 37.

<Second Discharge Connecting Passage 36>

A first end of the second discharge connecting passage 36 opens in the first facing surface 31a and is connected to the second discharge port R2. A second end of the second discharge connecting passage 36 opens in the second facing surface 31b and is connected to the second discharge passage 25. The second discharge connecting passage 36 thus connects the second discharge passage 25 and the second discharge port R2 to each other. The second discharge passage 25 and the second discharge port R2 are therefore connected to each other through the second discharge connecting passage 36.

<Configuration of Shaft Hole 37>

The shaft hole 37 includes a first shaft hole 38, a second shaft hole 39, a third shaft hole 40, a fourth shaft hole 41, and a fifth shaft hole 42. The first shaft hole 38, the second shaft hole 39, the third shaft hole 40, the fourth shaft hole 41, and the fifth shaft hole 42 are arranged in that order from the first end to the second end of the shaft hole 37. The first shaft hole 38 is continuous with the opening 37a of the shaft hole 37.

The second shaft hole 39 is continuous with the first shaft hole 38. The first passage 33a of the first output connecting passage 33 opens in the second shaft hole 39. The first passage 33a includes an opening H1, which opens in the inner peripheral surface of the second shaft hole 39. The second shaft hole 39 is a first hole in which the first passage 33a opens. The inner diameter of the second shaft hole 39 is smaller than the inner diameter of the first shaft hole 38.

The third shaft hole 40 is continuous with the second shaft hole 39. The third shaft hole 40 is continuous with the opening H1 of the first passage 33a. The second passage 33b of the first output connecting passage 33 opens in the third shaft hole 40. The second passage 33b includes an opening H2, which opens in the inner peripheral surface of the third shaft hole 40. The third shaft hole 40 is a second hole that is continuous with the opening H1 of the first passage 33a and in which the second passage 33b opens. The inner diameter of the third shaft hole 40 is smaller than the inner diameter of the second shaft hole 39. The third shaft hole 40 includes a valve seat, more specifically, a first valve seat 44 on the inner peripheral surface. The first valve seat 44 is located in a section of the inner peripheral surface between the opening H1 of the first passage 33a and the opening H2 of the second passage 33b.

The fourth shaft hole 41 is continuous with the third shaft hole 40. The first passage 34a of the second output connecting passage 34 opens in the fourth shaft hole 41. The first passage 34a includes an opening H3, which opens in the inner peripheral surface of the fourth shaft hole 41. The fourth shaft hole 41 is a first hole in which the first passage 34a opens. The inner diameter of the fourth shaft hole 41 is smaller than the inner diameter of the third shaft hole 40.

The fifth shaft hole 42 is continuous with the fourth shaft hole 41. The fifth shaft hole 42 is continuous with the opening H3 of the first passage 34a. The second passage 34b of the second output connecting passage 34 opens in the fifth shaft hole 42. The second passage 34b includes an opening H4, which opens in the inner peripheral surface of the fifth shaft hole 42. The fifth shaft hole 42 is a second hole that is continuous with the opening H3 of the first passage 34a and in which the second passage 34b opens. The inner diameter of the fifth shaft hole 42 is smaller than the inner diameter of the fourth shaft hole 41. The fifth shaft hole 42 includes a valve seat, more specifically, a second valve seat 46 on the inner peripheral surface. The second valve seat 46 is located in a section of the inner peripheral surface between the opening H3 of the first passage 34a and the opening H4 of the second passage 34b.

<Configuration of Manual Shaft 50>

The spacer 30 includes a manual shaft 50, which is movably accommodated in the shaft hole 37. The manual shaft 50 is columnar. The manual shaft 50 includes a first valve portion 51, a second valve portion 52, a third valve portion 53, and a fourth valve portion 54, which are separated from each other in the axial direction of the manual shaft 50. The first valve portion 51, the second valve portion 52, the third valve portion 53, and the fourth valve portion 54 are arranged in that order from a first end to a second end of the manual shaft 50. The outer diameter of the first valve portion 51 is larger than the outer diameter of the second valve portion 52. The outer diameter of the second valve portion 52 is larger than the outer diameter of the third valve portion 53. The outer diameter of the third valve portion 53 is larger than the outer diameter of the fourth valve portion 54.

An annular first seal member 51a is attached to the outer peripheral surface of the first valve portion 51. The first seal member 51a is made of rubber. The outer diameter of the first seal member 51a before being elastically deformed is smaller than the inner diameter of the first shaft hole 38 and is larger than the inner diameter of the second shaft hole 39. When the first valve portion 51 is located in the second shaft hole 39, the first seal member 51a is elastically deformed between the first valve portion 51 and the inner peripheral surface of the second shaft hole 39. The first seal member 51a closely contacts the inner peripheral surface of the second shaft hole 39. Accordingly, the first seal member 51a provides a seal between the inner peripheral surface of the second shaft hole 39 and the manual shaft 50.

The second valve portion 52 can be seated on the first valve seat 44. Therefore, the second valve portion 52 is a valve portion that can be seated on the first valve seat 44, and the first valve seat 44 is a valve seat on which the second valve portion 52 can be seated. Specifically, an annular second seal member 52a is attached to the outer peripheral surface of the second valve portion 52. The second seal member 52a is made of rubber. The outer diameter of the second seal member 52a before being elastically deformed is smaller than the inner diameter of the second shaft hole 39 and is larger than the inner diameter of the third shaft hole 40. When the second valve portion 52 is seated on the first valve seat 44, the second seal member 52a is elastically deformed between the second valve portion 52 and the first valve seat 44. The second seal member 52a then closely contacts the first valve seat 44. Accordingly, the second seal member 52a provides a seal between the first valve seat 44 and the manual shaft 50.

An annular third seal member 53a is attached to the outer peripheral surface of the third valve portion 53. The third seal member 53a is made of rubber. The outer diameter of the third seal member 53a before being elastically deformed is smaller than the inner diameter of the third shaft hole 40 and is larger than the inner diameter of the fourth shaft hole 41. When the third valve portion 53 is located in the fourth shaft hole 41, the third seal member 53a is elastically deformed between the third valve portion 53 and the inner peripheral surface of the fourth shaft hole 41. The third seal member 53a then closely contacts the inner peripheral surface of the fourth shaft hole 41. Accordingly, the third seal member 53a provides a seal between the inner peripheral surface of the fourth shaft hole 41 and the manual shaft 50.

The fourth valve portion 54 can be seated on the second valve seat 46. Therefore, the fourth valve portion 54 is a valve portion that can be seated on the second valve seat 46, and the second valve seat 46 is a valve seat on which the fourth valve portion 54 can be seated. Specifically, an annular fourth seal member 54a is attached to the outer peripheral surface of the fourth valve portion 54. The fourth seal member 54a is made of rubber. The outer diameter of the fourth seal member Ma before being elastically deformed is smaller than the inner diameter of the fourth shaft hole 41 and is larger than the inner diameter of the fifth shaft hole 42. When the fourth valve portion 54 is seated on the second valve seat 46, the fourth seal member 54a is elastically deformed between the fourth valve portion 54 and the second valve seat 46. The fourth seal member 54a then closely contacts the second valve seat 46. Accordingly, the fourth seal member 54a provides a seal between the second valve seat 46 and the manual shaft 50.

<First Switching Position and Second Switching Position>

The manual shaft 50 is manually operated through the opening 37a. The manual shaft 50 is switchable between the first switching position and the second switching position through manual operation. When in the first switching position, the manual shaft 50 allows for connection between the first output passage 22 and the first output port A1 through the first output connecting passage 33 and allows for connection between the second output passage 23 and the second output port A2 through the second output connecting passage 34. Specifically, when the manual shaft 50 is in the first switching position, the second valve portion 52 is located inside the second shaft hole 39, thereby allowing for connection between the first passage 33a and the second passage 33b through the shaft hole 37. Further, when the manual shaft 50 is in the first switching position, the fourth valve portion 54 is located inside the fourth shaft hole 41, thereby allowing for connection between the first passage 34a and the second passage 34b through the shaft hole 37.

Figure 4:
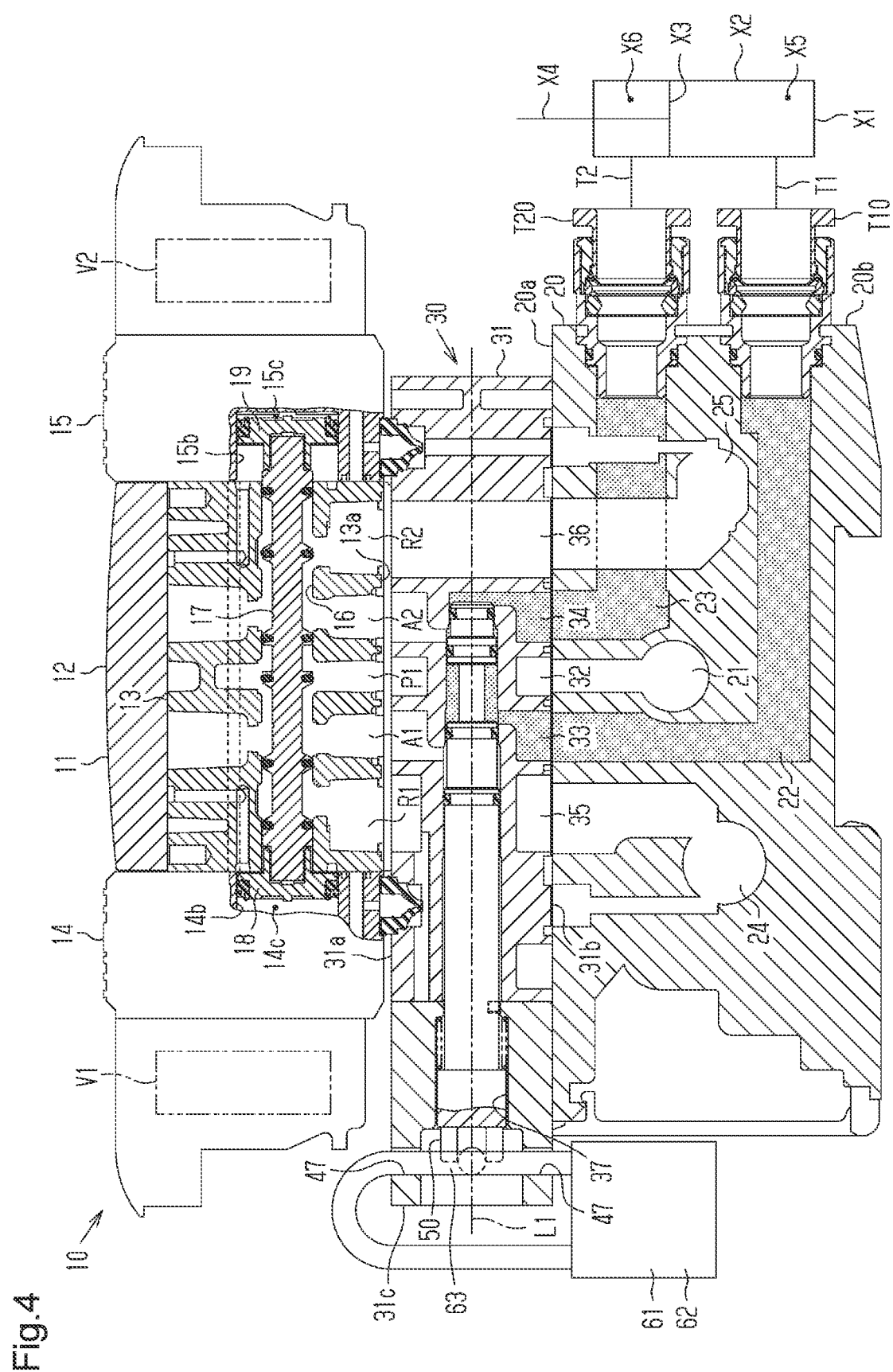
FIG. 4 is a cross-sectional view of the electromagnetic valve manifold of FIG. 1, showing flow of fluid when the manual shaft is in a second switching position.
Figure 5:
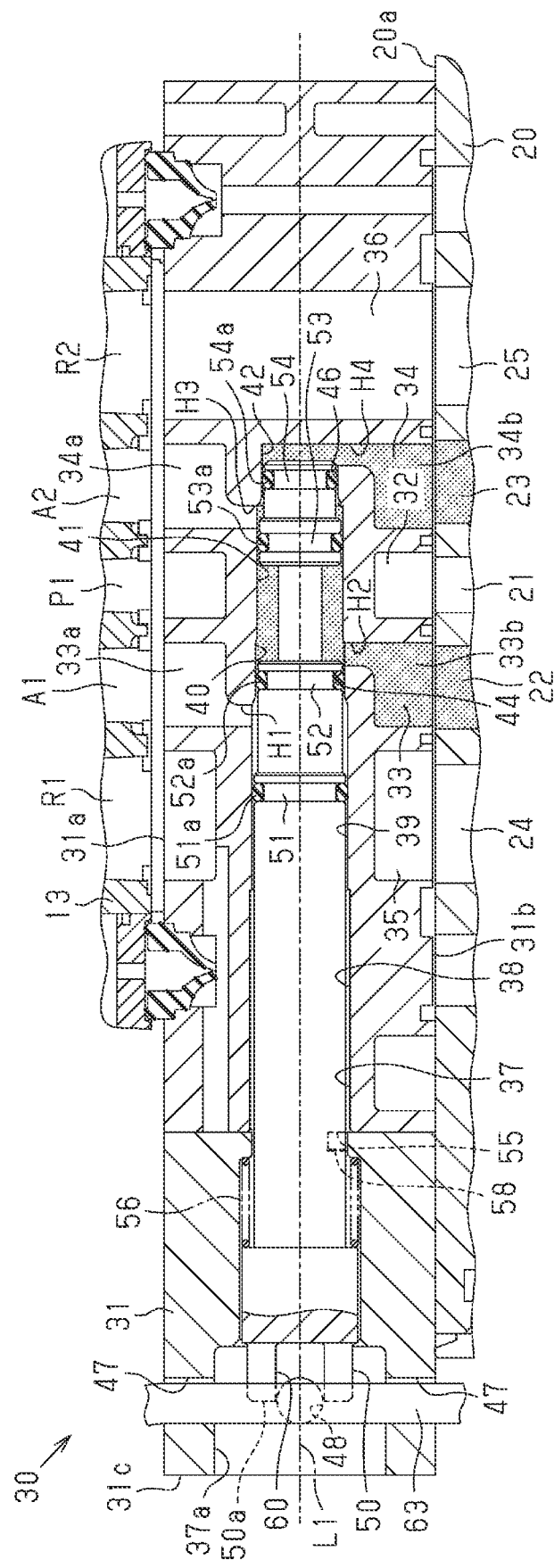
FIG. 5 is an enlarged cross-sectional view of the electromagnetic valve manifold of FIG. 1, showing the spacer when the manual shaft is in the second switching position.

When in the second switching position as shown in FIGS. 4 and 5, the manual shaft 50 blocks the connection between the first output passage 22 and the first output port A1 through the first output connecting passage 33 and blocks the connection between the second output passage 23 and the second output port A2 through the second output connecting passage 34. Specifically, when the manual shaft 50 is in the second switching position, the second valve portion 52 is seated on the first valve seat 44, thereby blocking the connection between the first passage 33a and the second passage 33b through the shaft hole 37. Further, when the manual shaft 50 is in the second switching position, the fourth valve portion 54 is seated on the second valve seat 46, thereby blocking the connection between the first passage 34a and the second passage 34b through the shaft hole 37.

<Configuration of Fixing Pin 55 and Urging Spring 56>

As shown in FIG. 3, the spacer 30 includes a fixing pin 55, which is an insertion member, and an urging spring 56, which is an urging member. The fixing pin 55 has the shape of an elongated thin column. The fixing pin 55 protrudes inward from the shaft hole 37.

The urging spring 56 is accommodated in the shaft hole 37. The urging spring 56 is located between the spacer block 31 and the manual shaft 50. A first end of the urging spring 56 is supported by the spacer block 31. A second end of the urging spring 56 is supported by the manual shaft 50. The urging spring 56 applies to the manual shaft 50 an urging force that urges the manual shaft 50 toward the first switching position.

<Configuration of Unlocking Hole 57 and Locking Hole 58>

The manual shaft 50 includes an unlocking hole 57 and a locking hole 58. The unlocking hole 57 opens in the outer peripheral surface of the manual shaft 50. The unlocking hole 57 extends in the axial direction of the manual shaft 50. The depth of the unlocking hole 57 is slightly larger than the outer diameter of the fixing pin 55. The depth of the unlocking hole 57 is the dimension of the unlocking hole 57 in a radial direction of the manual shaft 50.

The manual shaft 50 has an axis L1. When the fixing pin 55 is inserted in the unlocking hole 57, the unlocking hole 57 allows the manual shaft 50 to move relative to the shaft hole 37 along the axis L1, while preventing the manual shaft 50 from rotating about the axis L1 in the shaft hole 37.

The locking hole 58 opens in the outer peripheral surface of the manual shaft 50. The locking hole 58 extends in the circumferential direction of the manual shaft 50. The unlocking hole 57 includes a first end, which is close to the first end of the manual shaft 50. The locking hole 58 is continuous with the first end of the unlocking hole 57. When the manual shaft 50 is moved from the first switching position to the second switching position against the urging force of the urging spring 56 with the fixing pin 55 inserted in the unlocking hole 57, the locking hole 58 is located at the same position as the fixing pin 55 in the axial direction of the manual shaft 50. In this state, the locking hole 58 and the fixing pin 55 cooperate to allow the manual shaft 50 to rotate about the axis L1. That is, the fixing pin 55 is inserted into the locking hole 58 so that the manual shaft 50 is permitted to rotate about the axis L1 in the shaft hole 37. When the fixing pin 55 is inserted into the locking hole 58, the manual shaft 50 is prevented from being moved toward the first switching position by the urging force of the urging spring 56. In the present embodiment, the length in the circumferential direction of the locking hole 58 is set to allow the manual shaft 50 to rotate about the axis L1 by 90°.

<First Through-Holes 47 and Second Through-Holes 48>

Figure 6:
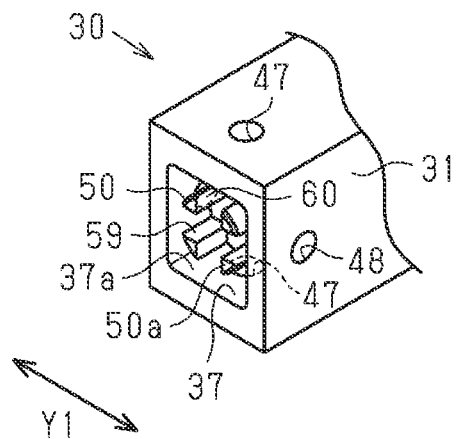
FIG. 6 is a perspective view showing a part of the spacer in the electromagnetic valve manifold of FIG. 1.

As shown in FIG. 6, the spacer block 31 includes two first through-holes 47 and two second through-holes 48. The spacer block 31 includes two sets of two through-holes. The two first through-holes 47 extend through the spacer block 31 to be connected to the shaft hole 37. As shown in FIG. 5, the two first through-holes 47 are closer to the opening 37a in the axial direction of the manual shaft 50 than the manual shaft 50 located in the second switching position. The two first through-holes 47 are located on opposite sides of the axis of the shaft hole 37. The two first through-holes 47 have a common axis. The axis of the two first through-holes 47 is orthogonal to the axis of the shaft hole 37. The two first through-holes 47 extend through the spacer block 31 in a direction orthogonal to the arrangement direction Y1.

The two second through-holes 48 extend through the spacer block 31 to be connected to the shaft hole 37. The two second through-holes 48 are closer to the opening 37a in the axial direction of the manual shaft 50 than the manual shaft 50 located in the second switching position. The two second through-holes 48 are located on opposite sides of the axis of the shaft hole 37. The axes of the two second through-holes 48 agree with each other. The axes of the two second through-holes 48 are orthogonal to the axis of the shaft hole 37. The two second through-holes 48 extend through the spacer block 31 in the arrangement direction Y1. The second through-holes 48 of all of the spacers 30 are arranged on a single straight line extending in the arrangement direction Y1. The axis of each two second through-holes 48 is orthogonal to the axis of the corresponding two first through-holes 47.

<First Groove 59 and Second Groove 60>

As shown in FIGS. 3 and 6, the manual shaft 50 includes two grooves, which are a first groove 59 and a second groove 60, in an end face 50a at the first end. The first groove 59 and the second groove 60 traverse the end face 50a of the manual shaft 50. The first groove 59 and the second groove 60 each extend in a radial direction of the manual shaft 50. The first groove 59 and the second groove 60 are orthogonal to each other.

The first groove 59 extends along the axis of the second through-holes 48 when the manual shaft 50 is in the first switching position. The first groove 59 extends along the axis of the first through-holes 47 when the manual shaft 50 is in the second switching position and is prevented from moving toward the first switching position by the fixing pin 55 engaged with the locking hole 58. Thus, the first groove 59 extends in the end face 50a of the manual shaft 50 in a direction orthogonal to the arrangement direction Y1 when the manual shaft 50 is in the second switching position and is prevented from moving toward the first switching position.

The second groove 60 extends along the axis of the first through-holes 47 when the manual shaft 50 is in the first switching position. The second groove 60 extends along the axes of the second through-holes 48 when the manual shaft 50 is in the second switching position and is prevented from moving toward the first switching position. Thus, the second groove 60 extends in the end face 50a of the manual shaft 50 in the arrangement direction Y1 when the manual shaft 50 is in the second switching position and is prevented from moving toward the first switching position.

<Padlock 61>

Figure 7:
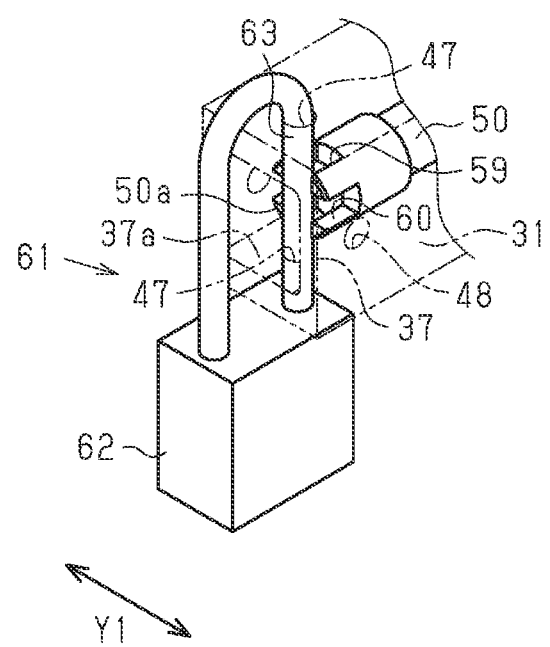
FIG. 7 is a perspective view showing a state in which a padlock is attached to the spacer in the electromagnetic valve manifold of FIG. 1.

As shown in FIGS. 4 and 7, a padlock 61, which is a locking member, can be attached to the spacer block 31 with the manual shaft 50 located in the second switching position. The padlock 61 includes a body 62 and a shackle 63. The shackle 63 has the shape of a U. In the present embodiment, the padlock 61 is attached to the spacer block 31 by inserting the shackle 63 into the two first through-holes 47. The padlock 61 is attached to a part of the spacer block 31 that is on a side opposite to the first coupling T10 and the second coupling T20. The padlock 61 is locked up to prevent the manual shaft 50 from being manually operated. The shackle 63 traverses the opening 37a of the shaft hole 37. In other words, the shackle 63 partially closes the opening 37a of the shaft hole 37. Thus, when the manual shaft 50 is in the second switching position, the shackle 63 of the padlock 61 can be inserted into the first through-holes 47 while partially closing the opening 37a. The shackle 63 is engaged with the first groove 59. Thus, the first groove 59 is an engagement portion with which the shackle 63, which partially closes the opening 37a, is engaged.

When the manual shaft 50 is in the second switching position and is prevented from moving toward the first switching position, the shackle 63 is engaged with the first groove 59 to prevent the manual shaft 50 from rotating. Therefore, the first groove 59 extends along the axis of the two first through-holes 47 when the manual shaft 50 is in the second switching position and is prevented from moving toward the first switching position.

<Operation>

Operation of the present embodiment will now be described.

It is now assumed, for example, that voltage is applied to the first pilot valve V1, and that voltage is not applied to the second pilot valve V2, so that the spool valve 17 is in the first position as shown in FIG. 2. At this time, if the manual shaft 50 has been switched to the first switching position as shown in FIGS. 2 and 3, the fluid from the fluid supply source is supplied to the first pressure chamber X5 of the actuator X1 through the piping, the supply passage 21, the supply connecting passage 32, the supply port P1, the first output port A1, the first output connecting passage 33, the first output passage 22, and the first pipe T1. When the fluid is supplied to the first pressure chamber X5, the piston X3 is pushed into the second pressure chamber X6, so that the piston rod X4 moves in a direction of protruding from the cylinder tube X2. Further, the fluid in the second pressure chamber X6 is discharged to the atmosphere through the second pipe T2, the second output passage 23, the second output connecting passage 34, the second output port A2, the second discharge port R2, the second discharge connecting passage 36, the second discharge passage 25, and the piping. In this manner, the actuator X1, which is connected to the first output connecting passage 33 and the second output connecting passage 34, is operated by the fluid flowing through the first output connecting passage 33 and the second output connecting passage 34.

When maintenance is performed, the operation of the actuator X1 must be stopped. The manual shaft 50 is thus manually switched from the first switching position to the second switching position. In the manual operation, the operator first pushes the manual shaft 50 through the opening 37a of the shaft hole 37 until the manual shaft 50 reaches the second switching position. At this time, the manual shaft 50 is pushed against the urging force of the urging spring 56 with the fixing pin 55 inserted into the unlocking hole 57. After the manual shaft 50 is moved from the first switching position to the second switching position, the manual shaft 50 is rotated 90° so as to insert the fixing pin 55 into the locking hole 58. This prevents the manual shaft 50 from being moved to the first switching position by the urging force of the urging spring 56. That is, the locking hole 58 and the fixing pin 55, which is engaged with the locking hole 58, maintain the manual shaft 50 in the second switching position.

When in the second switching position as shown in FIGS. 4 and 5, the manual shaft 50 blocks the connection between the first output passage 22 and the first output port A1 through the first output connecting passage 33 and blocks the connection between the second output passage 23 and the second output port A2 through the second output connecting passage 34. Thus, the path from the first output port A1 to the actuator X1 and the path from the second output port A2 to the actuator X1 are blocked.

Thus, when switched from the first switching position to the second switching position, the manual shaft 50 blocks the connection between the first output passage 22 and the first output port A1 through the first output connecting passage 33. Therefore, even if the pressure of the fluid in the first output port A1 changes due to malfunction of the spool valve 17 of the electromagnetic valve 11 when the manual shaft 50 is in the second switching position, the pressure of the fluid between the first output passage 22 and the actuator X1 remains the same. Accordingly, the pressure of the fluid between the first output passage 22 and the actuator X1 is maintained. The operation of the actuator X1 is thus stopped reliably. As a result, the maintenance is performed safely.

<Advantages>

The above-described embodiment has the following advantages.

(1) The manual shaft 50 is switchable between the first switching position and the second switching position. When switched to the second switching position, the manual shaft 50 blocks the connection between the first output passage 22 and the first output port A1 through the first output connecting passage 33 and blocks the connection between the second output passage 23 and the second output port A2 through the second output connecting passage 34. This blocks the path from the first output port A1 to the actuator X1 and the path from the second output port A2 to the actuator X1 are blocked. Therefore, even if the pressure of the fluid in the first output port A1 or the pressure of the fluid in the second output port A2 changes, for example, due to malfunction of the spool valve 17 of the electromagnetic valve 11 when the manual shaft 50 is in the second switching position, the pressure of the fluid between the first output passage 22 and the actuator X1 and the pressure of the fluid between the second output passage 23 and the actuator X1 remain the same. As a result, the pressure of the fluid between the first output passage 22 and the actuator X1, and the pressure of the fluid between the second output passage 23 and the actuator X1 are maintained. The operation of the actuator X1 thus can be stopped reliably by switching the manual shaft 50 to the second switching position. Accordingly, the reliability is improved.

(2) The padlock 61 can be attached to the spacer block 31 with the manual shaft 50 located in the second switching position. When located in the second switching position, the manual shaft 50 cannot be operated manually if the padlock 61 is attached to the spacer block 31. This prevents the operator from accidentally moving the manual shaft 50 from the second switching position to the first switching position. If the operator locks up the padlock 61 attached to the spacer block 31, the manual shaft 50 is prevented from being operated manually by a third person against the will of the operator. Accordingly, the reliability is further improved.

(3) When the manual shaft 50 is in the second switching position, the shackle 63 of the padlock 61 is inserted into the first through-holes 47 while partially closing the opening 37a. Since the shackle 63 of the padlock 61 is passed through the two first through-holes 47 when the padlock 61 is attached to the spacer block 31, the padlock 61 is attached to the spacer block 31 in a stable manner. Further, the padlock 61 is attached to the spacer block 31 with the shackle 63 of the padlock 61 partially closing the opening 37a of the shaft hole 37. The shackle 63 of the padlock 61 traverses the opening 37a. The padlock 61 prevents the manual shaft 50 located in the second switching position from being manually operated through the opening 37a of the shaft hole 37.

(4) After the manual shaft 50 is moved from the first switching position to the second switching position against the urging force of the urging spring 56 with the fixing pin 55 inserted in the unlocking hole 57, the fixing pin 55 is inserted into the locking hole 58 to allow the manual shaft 50 to rotate. When the fixing pin 55 is inserted into the locking hole 58, the manual shaft 50 is prevented from moving toward the first switching position and is maintained in the second switching position. When the manual shaft 50 is located in the second switching position, the shackle 63 of the padlock 61 is engaged with the first groove 59 of the manual shaft 50. This prevents the manual shaft 50 from rotating in the second switching position. The manual shaft 50 is thus prevented from rotating in the second switching position against the will of the operator. Therefore, the manual shaft 50 is prevented from moving from the second switching position to the first switching position by the urging force of the urging spring 56 against the will of the operator. As a result, the manual shaft 50 will not be switched to the first switching position accidentally. Accordingly, the reliability is further improved.

(5) The two first through-holes 47 have a common axis. The first groove 59 extends along the axis of the first through-holes 47 when the manual shaft 50 is in the second switching position. Thus, the shackle 63 of the padlock 61, which is passed through the two first through-holes 47 and traverses the opening 37a of the shaft hole 37, can be easily engaged with the first groove 59.

(6) When the manual shaft 50 moves from the first switching position to the second switching position, the second valve portion 52 can be seated on the first valve seat 44 without being caught by the opening H1 of the first passage 33a. Since the manual shaft 50 moves smoothly, the manual shaft 50 can be manually operated easily. Also, when the manual shaft 50 moves from the first switching position to the second switching position, the fourth valve portion 54 can be seated on the second valve seat 46 without being caught by the opening H3 of the first passage 34*a*. Since the manual shaft 50 moves smoothly, the manual shaft 50 can be manually operated easily.

(7) The manual shaft 50 includes the first groove 59 and the second groove 60, and the spacer 30 includes the first through-holes 47 and the second through-holes 48. This allows the operator to select whether to pass the shackle of a padlock through the first through-holes 47 or the second through-holes 48.

(8) The padlock 61 is attached to a part of the spacer block 31 that is on a side opposite to the first coupling T10 and the second coupling T20. With this configuration, when the shackle 63 of the padlock 61 is passed through the two first through-holes 47 of the spacers 30 and is engaged with the first groove 59 of the manual shaft 50, the padlock 61 is not likely to interfere with the first coupling T10, the second coupling T20, the first pipe T1, or the second pipe T2. This allows the padlock 61 to be easily attached to the spacer block 31.

<Modifications>

The above-described embodiment may be modified as follows. The above-described embodiment and the following modifications can be combined as long as the combined modifications remain technically consistent with each other.

Figure 8:
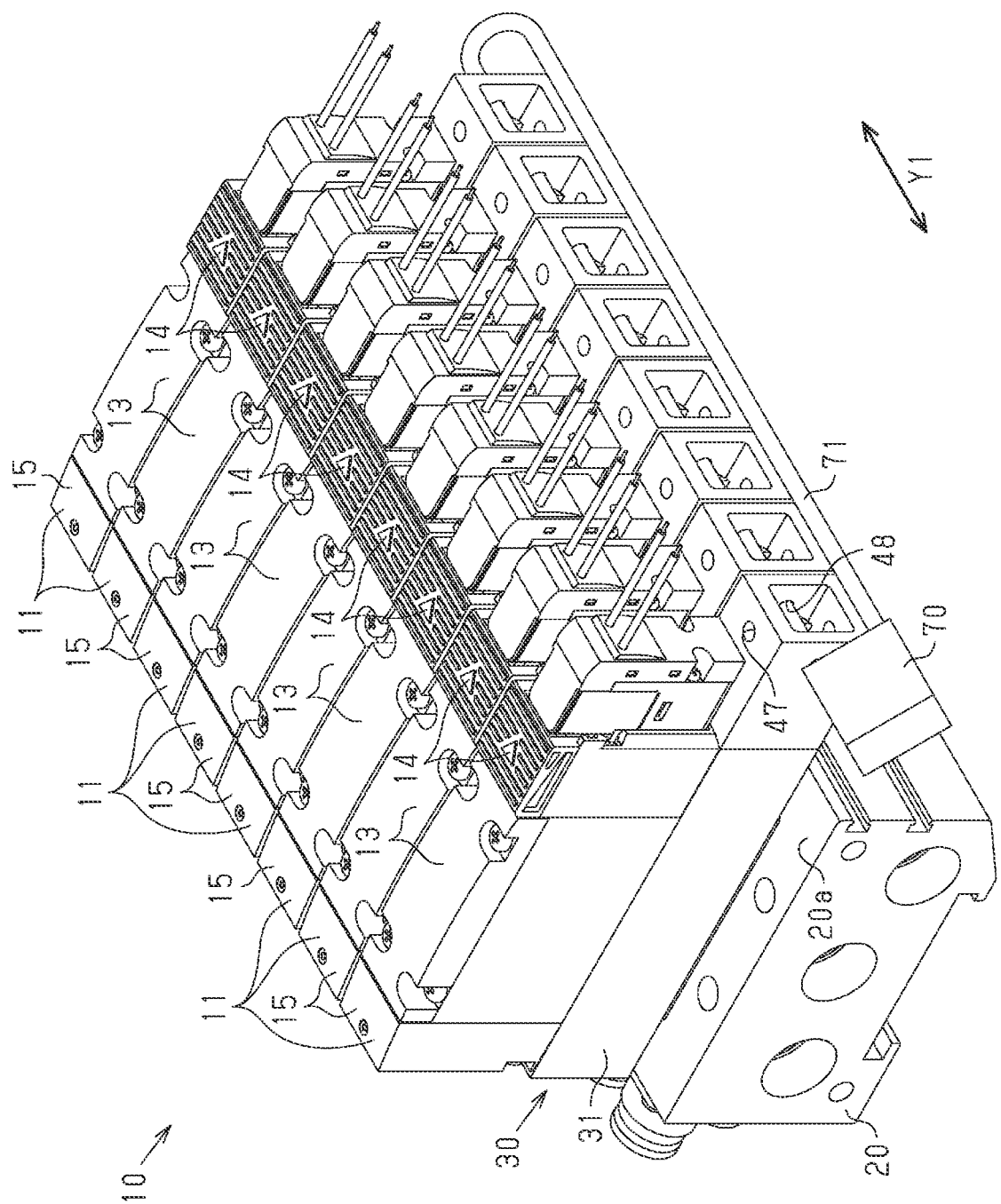
FIG. 8 is a perspective view of an electromagnetic valve manifold according to another embodiment.

As shown in FIG. 8, a shackle 71 of a common single padlock 70 may be used for all of the spacers 30. The shackle 71 of the single padlock 70 is passed through the second through-holes 48 of all of the spacers 30 and engaged with the second grooves 60 of all of the manual shafts 50. This eliminates the necessity to operate multiple padlocks prepared for the respective spacers 30. This simplifies the procedure.

In the above-described embodiment, the manual shaft 50 does not necessarily need to include the second groove 60, and the spacer 30 does not necessarily need to include the two second through-holes 48.

In the above-described embodiment, the spacer 30 does not necessarily need to include the urging spring 56. In this case, the manual shaft 50 may be urged toward the first switching position by the pressure of fluid, and the manual shaft 50 may be switched to the first switching position by the pressure of the fluid.

In the above-described embodiment, the padlock 61 does not necessarily need to be passed through the two first through-holes 47 with the shackle 63 partially closing the opening 37*a*. That is, the padlock 61 may be attached to the spacer block 31 in any manner as long as the padlock 61 prevents the manual shaft 50 from being manually operated with the manual shaft 50 being located in the second switching position.

In the above-described embodiment, the two first through-holes 47 do not necessarily need to have a common axis. This modification is possible if the shackle 63 of the padlock 61 inserted into the first through-holes 47 is engaged with part of the manual shaft 50.

In the above-described embodiment, the padlock 61 does not necessarily need to be attached to the spacer block 31.

In the above-described embodiment, the electromagnetic valves 11 may be a four-port electromagnetic valve from which, for example, the second discharge port R2 is omitted. That is, any type of electromagnetic valve may be used as the electromagnetic valve 11 as long as the electromagnetic valve 11 includes at least one discharge port. Also, the electromagnetic valve 11 may be a three-port electromagnetic valve that includes a supply port, an output port, and a discharge port.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic valve manifold, comprising:
   an electromagnetic valve;
   a manifold base on which the electromagnetic valve is mounted, the manifold base including a supply passage, an output passage, and a discharge passage; and
   a spacer provided between the manifold base and the electromagnetic valve, wherein
   the electromagnetic valve includes:
      a valve casing including a valve hole;
      a valve member that is movably accommodated in the valve hole; and
      a supply port, an output port, and a discharge port that are formed in the valve casing and respectively connected to the valve hole,
   the spacer includes:
      a spacer block including a shaft hole; and
      a manual shaft movably accommodated in the shaft hole, the spacer block includes:
      a supply connecting passage that connects the supply passage and the supply port to each other;
      a discharge connecting passage that connects the discharge passage and the discharge port to each other; and
      an output connecting passage that is connected to the shaft hole and connects the output passage and the output port to each other,
   the output passage is configured such that a fluid flowing through the output passage drives a fluid pressure device connected to the output passage, and
   the manual shaft is configured to be manually operated so as to be switched between a first switching position, in which the manual shaft allows for connection between the output passage and the output port through the output connecting passage, and a second switching position, in which the manual shaft blocks the connection between the output passage and the output port through the output connecting passage.

2. The electromagnetic valve manifold according to claim 1, wherein the spacer block is configured such that a locking member is attached to the spacer block so as to prevent the manual shaft, when located in the second switching position, from being manually operated.

3. The electromagnetic valve manifold according to claim 2, wherein
   the shaft hole includes an opening that opens in an end face of the spacer block,
   the manual shaft is configured to be manually operated through the opening, the spacer block includes two through-holes that are connected to the shaft hole, the two through-holes are closer to the opening, in an axial direction of the manual shaft, than the manual shaft when the manual shaft is located in the second switching position, the two through-holes are located on opposite sides of an axis of the shaft hole, the locking member includes a padlock, and the two through-holes are configured such that, when the manual shaft is located in the second switching position, a shackle of the padlock is passed through the two through-holes with the shackle partially closing the opening.

4. The electromagnetic valve manifold according to claim 3, wherein the spacer includes:
an insertion member that protrudes inward from the shaft hole; and
an urging member that is accommodated in the shaft hole and applies to the manual shaft an urging force that urges the manual shaft toward the first switching position, the manual shaft includes an unlocking hole and a locking hole, the insertion member being permitted to be inserted into the unlocking hole and the locking hole, the unlocking hole is configured to, with the insertion member inserted in the unlocking hole, allow the manual shaft to move in an axial direction of the manual shaft relative to the shaft hole, and prevent the manual shaft from rotating about the axis of the manual shaft in the shaft hole, and the locking hole is configured to, with the manual shaft located in the second switching position and the insertion member inserted in the locking hole, allow the manual shaft to rotate about the axis of the manual shaft in the shaft hole, and prevent the manual shaft from moving toward the first switching position.

5. The electromagnetic valve manifold according to claim 4, wherein the manual shaft includes an engagement portion, the engagement portion being configured such that the shackle partially closing the opening is engaged with the engagement portion, so as to prevent the manual shaft from rotating, and the manual shaft is configured such that the shackle is engaged with the engagement portion when the manual shaft is in the second switching position and the locking hole prevents the manual shaft from moving toward the first switching position.

6. The electromagnetic valve manifold according to claim 5, wherein the two through-holes have a common axis, the engagement portion includes a groove formed in an end face of the manual shaft, and the groove extends along the axis of the two through-holes when the manual shaft is in the second switching position and the locking hole prevents the manual shaft from moving toward the first switching position.

7. The electromagnetic valve manifold according to claim 1, wherein the output connecting passage includes:
a first passage that includes a first opening in an inner peripheral surface of the shaft hole, the first passage connecting the output port and the shaft hole to each other; and
a second passage that includes a second opening in the inner peripheral surface of the shaft hole, the second passage connecting the output passage and the shaft hole to each other, the shaft hole includes:
a first hole in which the first passage opens; and
a second hole that is continuous with the first opening and in which the second passage opens, an inner diameter of the second hole is smaller than an inner diameter of the first hole, the manual shaft includes a valve portion, an inner peripheral surface of the second hole includes a section between the first opening and the second opening, the section forming a valve seat on which the valve portion is allowed to be seated, when the manual shaft is in the first switching position, the valve portion is located inside the first hole so as to allow for connection between the first passage and the second passage through the shaft hole, and when the manual shaft is in the second switching position, the valve portion is seated on the valve seat so as to block the connection between the first passage and the second passage through the shaft hole.

8. The electromagnetic valve manifold according to claim 6, wherein the electromagnetic valve includes multiple electromagnetic valves arranged side by side, the spacer includes multiple spacers arranged side by side in a same direction as an arrangement direction of the electromagnetic valves, each spacer arranged between the corresponding electromagnetic valve and the manifold base, the two through-holes extend through the spacer block in a direction orthogonal to an arrangement direction of the spacers, and the groove extends in the direction orthogonal to the arrangement direction of the spacers when the manual shaft is in the second switching position.

9. The electromagnetic valve manifold according to claim 6, wherein the electromagnetic valve includes multiple electromagnetic valves arranged side by side, the spacer includes multiple spacers arranged side by side in a same direction as an arrangement direction of the electromagnetic valves, each spacer arranged between the corresponding electromagnetic valve and the manifold base, the two through-holes extend through the spacer block in an arrangement direction of the spacers, the through-holes of all of the spacers are arranged on a single straight line extending in the arrangement direction of the spacers, and the groove extends in the arrangement direction of the spacers when the manual shaft is in the second switching position.

10. The electromagnetic valve manifold according to claim 6, wherein the two through-holes are two first through-holes, the spacer block further includes two second through-holes, which have an axis orthogonal to the axis of the two first through-holes, the groove is a first groove, the manual shaft further includes a second groove, which is formed in the end face of the manual shaft, and the second groove extends along the axis of the two second through-holes when the manual shaft is in the second switching position and the locking hole prevents the manual shaft from moving toward the first switching position.

\* \* \* \* \*